United States Patent
Wakao et al.

(10) Patent No.: US 9,135,423 B2
(45) Date of Patent: Sep. 15, 2015

(54) INFORMATION PROCESSING SYSTEM

(75) Inventors: Satoru Wakao, Kanagawa (JP); Hiroshi Mizuno, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 109 days.

(21) Appl. No.: 13/824,242

(22) PCT Filed: Oct. 11, 2011

(86) PCT No.: PCT/JP2011/005684
§ 371 (c)(1),
(2), (4) Date: Mar. 15, 2013

(87) PCT Pub. No.: WO2012/049832
PCT Pub. Date: Apr. 19, 2012

(65) Prior Publication Data
US 2013/0185568 A1    Jul. 18, 2013

(30) Foreign Application Priority Data

Oct. 12, 2010    (JP) .................................. 2010-229895

(51) Int. Cl.
G06F 21/20    (2006.01)
G06F 21/34    (2013.01)
(Continued)

(52) U.S. Cl.
CPC ................ *G06F 21/34* (2013.01); *G06F 21/35* (2013.01); *G06F 21/445* (2013.01); *G06Q 20/3226* (2013.01); *G06Q 20/341* (2013.01)

(58) Field of Classification Search
CPC ............. G06F 21/30; G06F 21/44; H04L 9/32
USPC .............. 726/2, 9, 27, 20; 713/157, 185, 159, 713/176; 235/380
See application file for complete search history.

(56) References Cited

U.S. PATENT DOCUMENTS 5,708,442 A    1/1998  Whelan
6,220,510 B1 *  4/2001  Everett et al. ................. 235/380
(Continued)

FOREIGN PATENT DOCUMENTS

JP    8-339407    12/1996
JP    2001-306987    11/2001
(Continued)

OTHER PUBLICATIONS

Manoj Kumar, "A new secure remote user authentication scheme with smart cards", Jun. 2009, IEEE, vol. 11, pp. 88-93.*
(Continued)

*Primary Examiner* — Dede Zecher
*Assistant Examiner* — Viral Lakhia
(74) *Attorney, Agent, or Firm* — Dickinson Wright PLLC

(57) ABSTRACT

An information processing system includes an information processing device and a portable terminal. The information processing device includes a card processing section that communicates with an IC chip of an IC card (card IC chip), and when security is satisfied between the information processing device and the card IC chip, performs information processing function of the card IC chip. Authentication processing between an IC chip (terminal IC chip) of the portable terminal and the card IC chip is performed through the card processing section, and secure communication is provided between the terminal IC chip and the card IC chip through the card processing section when the authentication processing is successful. Information input on the portable terminal is transmitted to the card IC chip through the secure communication. In this way, high user convenience can be achieved and increased security can also be achieved for the entire system.

15 Claims, 6 Drawing Sheets

(51) Int. Cl.
*G06F 21/35* (2013.01)
*G06F 21/44* (2013.01)
*G06Q 20/34* (2012.01)
*G06Q 20/32* (2012.01)

(56) References Cited

U.S. PATENT DOCUMENTS

| | | | |
|---|---|---|---|
| 6,990,588 B1* | 1/2006 | Yasukura | 713/186 |
| 7,242,277 B2* | 7/2007 | Minemura | 340/5.53 |
| 7,424,732 B2* | 9/2008 | Matsumoto et al. | 726/2 |
| 7,434,070 B2* | 10/2008 | Moitrel et al. | 713/194 |
| 7,539,861 B2* | 5/2009 | Trench | 713/157 |
| 8,131,260 B2* | 3/2012 | Onozu et al. | 455/411 |
| 8,145,899 B2* | 3/2012 | Trench | 713/157 |
| 8,209,754 B2* | 6/2012 | Cheon et al. | 726/20 |
| 8,516,565 B2* | 8/2013 | Kato et al. | 726/9 |
| 2001/0034707 A1 | 10/2001 | Sakaguchi | |
| 2005/0246553 A1* | 11/2005 | Nakamura et al. | 713/193 |
| 2007/0119917 A1* | 5/2007 | Tomikawa et al. | 235/380 |
| 2009/0119516 A1 | 5/2009 | Tanabiki | |
| 2009/0193264 A1* | 7/2009 | Fedronic et al. | 713/184 |
| 2009/0307139 A1* | 12/2009 | Mardikar et al. | 705/67 |
| 2009/0314841 A1* | 12/2009 | Tomoeda | 235/492 |
| 2011/0119486 A1* | 5/2011 | Boldyrev et al. | 713/156 |
| 2011/0195749 A1* | 8/2011 | Lan | 455/558 |
| 2012/0074219 A1* | 3/2012 | Burdett | 235/380 |
| 2013/0211929 A1* | 8/2013 | Itwaru | 705/16 |

FOREIGN PATENT DOCUMENTS

| | | |
|---|---|---|
| JP | 2001-307043 | 11/2001 |
| JP | 2003-032241 | 1/2003 |
| JP | 2003-157239 | 5/2003 |
| JP | 2003-303309 | 10/2003 |
| JP | 2007-148680 | 6/2007 |
| JP | 2007-293826 | 11/2007 |
| JP | 2010-204808 | 9/2010 |

OTHER PUBLICATIONS

International Search Report dated Nov. 22, 2011.
Japanese Office Action dated Nov. 18, 2014.
Japanese Office Action dated Jun. 30, 2015.

* cited by examiner

INFORMATION PROCESSING SYSTEM

TECHNICAL FIELD

The present invention relates to an information processing system including an information processing device and a portable terminal, and in particular to a technique for sending information input on a portable terminal to an IC chip in an IC card, which is to be processed by an information processing device.

BACKGROUND ART

Some IC cards have a credit function (for example, credit card) and others are entry cards for entry control to a room. Such IC cards can be used for settlement processing (for example, payment at the register in a shop or the like). In general, the settlement processing with an IC card involves inputting personal identification number (PIN) information.

Conventional information processing devices, such as a POS terminal, have a connection to an input pad or a key device placed near a door for inputting a personal identification number to open a lock, which allow the use of numeral keys to input a personal identification number. The personal identification number input on the input pad or the like is sent from the information processing device to an IC card. In the IC card, the personal identification number is collated and when it is confirmed that security is satisfied, the settlement processing or unlocking processing are performed (for example, see Patent Literature 1).

In a conventional system, however, if the input pad or the information processing device is tampered, a third party will allowed to obtain important information (PIN information) and security of the system will failed. In addition, a conventional input pad is connected to the information processing device with a cable and is difficult to use (for example, to pay at the register in a shop) at a distance from the information processing device, which reduces user convenience.

CITATION LIST

Patent Literature

Patent Literature 1: Japanese Patent Laid-Open No. 2001-307043

SUMMARY OF INVENTION

Technical Problem

The present invention has been made under such circumstances. An object of the invention is to provide an information processing system that has high user convenience and increased security of the system.

Solution to Problem

An aspect of the invention is an information processing system. The system is an information processing system including an information processing device and a portable terminal, the information processing device including: a card processing section that communicates with a card IC chip, which is an IC chip provided on an IC card, and when security is satisfied between the information processing device and the card IC chip, performs information processing function of the card IC chip; an authentication processing section that performs authentication processing between a terminal IC chip, which is an IC chip provided on the portable terminal, and the card IC chip through the card processing section; and a secure communication section that provides secure communication between the terminal IC chip and the card IC chip through the card processing section when the authentication processing is successful, wherein information input on the portable terminal is transmitted to the card IC chip through the secure communication.

A further aspect of the invention is an information processing device. The device is an information processing device for use in an information processing system including a portable terminal, the device including: a card processing section that communicates with a card IC chip, which is an IC chip provided on an IC card, and when security is satisfied between the information processing device and the card IC chip, performs information processing function of the card IC chip; an authentication processing section that performs authentication processing between a terminal IC chip, which is an IC chip provided on the portable terminal, and the card IC chip through the card processing section; and a secure communication section that provides secure communication between the terminal IC chip and the card IC chip through the card processing section when the authentication processing is successful, wherein information input on the portable terminal is transmitted to the card IC chip through the secure communication.

A still further aspect of the invention is an information processing method. The method is used in an information processing system including an information processing device and a portable terminal, the information processing device including a card processing section that communicates with a card IC chip, which is an IC chip provided on an IC card, and when security is satisfied between the information processing device and the card IC chip, performs information processing function of the card IC chip, the method including: performing authentication processing between a terminal IC chip, which is an IC chip provided on the portable terminal, and the card IC chip through the card processing section; and providing secure communication between the terminal IC chip and the card IC chip through the card processing section when the authentication processing is successful, wherein information input on the portable terminal is transmitted to the card IC chip through the secure communication.

A still further aspect of the invention is a portable terminal. The terminal is a portable terminal used in an information processing system including an information processing device, the information processing device including a card processing section that communicates with a card IC chip, which is an IC chip provided on an IC card, and when security is satisfied between the information processing device and the card IC chip, performs information processing function of the card IC chip, the portable terminal including: an authentication processing section that performs authentication processing between a terminal IC chip, which is an IC chip provided on the portable terminal, and the card IC chip through the card processing section; and a secure communication section that provides secure communication between the terminal IC chip and the card IC chip through the card processing section when the authentication processing is successful, wherein information input on the portable terminal is transmitted to the card IC chip through the secure communication.

A still further aspect of the invention is an SIM chip. The chip is an SIM chip provided on a terminal device the terminal device being used in an information processing system including an information processing device, the information processing device including a card processing section that communicates with a card IC chip, which is an IC chip provided on an IC card, and when security is satisfied between the information processing device and the card IC chip, performs information processing function of the card IC chip; the SIM chip including: an authentication processing section that performs authentication processing between the SIM chip and the card IC chip through the card processing section; and a secure communication section that provides secure communication between the SIM chip and the card IC chip through the card processing section when the authentication processing is successful, wherein information input on the portable terminal is transmitted to the card IC chip through the secure communication.

A still further aspect of the invention is a security processing chip. The chip is a security processing chip provided on a terminal device, the terminal device being used in an information processing system including an information processing device, the information processing device including a card processing section that communicates with a card IC chip, which is an IC chip provided on an IC card, and when security is satisfied between the information processing device and the card IC chip, performs information processing function of the card IC chip; the security processing chip including: an authentication processing section that performs authentication processing between the security processing chip and the card IC chip through the card processing section; and a secure communication section that provides secure communication between the security processing chip and the card IC chip through the card processing section when the authentication processing is successful, wherein information input on the portable terminal is transmitted to the card IC chip through the secure communication.

As described herein, there are other embodiments of the invention. Therefore, the disclosure of the invention is intended to provide some aspects of the invention and is not intended to limit the scope of the invention as described and claimed herein.

DESCRIPTION OF EMBODIMENTS

Figure 1:
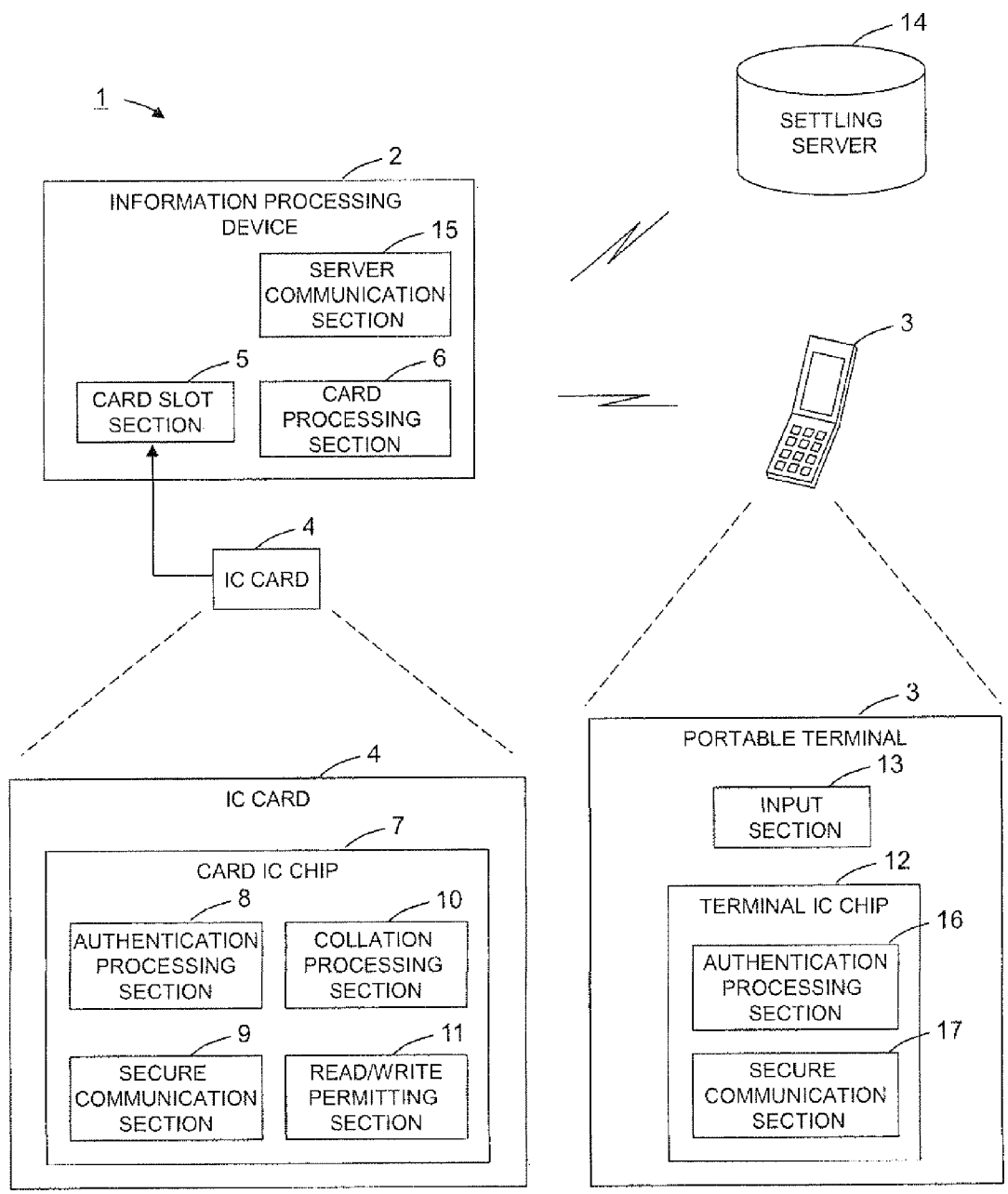
FIG. 1 is a diagram for illustrating a configuration of an information processing system according to a first embodiment of the invention.

The present invention will now be described in detail. The detailed description below and attached drawings, however, are not intended to limit the present invention.

The information processing system of the present invention is an information processing system including an information processing device and a portable terminal, the information processing device including: a card processing section that communicates with a card IC chip, which is an IC chip provided on an IC card, and when security is satisfied between the information processing device and the card IC chip, performs information processing function of the card IC chip; an authentication processing section that performs authentication processing between a terminal IC chip, which is an IC chip provided on the portable terminal, and the card IC chip through the card processing section; and a secure communication section that provides secure communication between the terminal IC chip and the card IC chip through the card processing section when the authentication processing is successful, wherein information input on the portable terminal is transmitted to the card IC chip through the secure communication.

With this configuration, authentication processing between the card IC chip and the terminal IC chip is performed, and when the authentication processing is successful (successful authentication), secure communication is provided between the card IC chip and the terminal IC chip. Then, information (for example, PIN information) input on the portable terminal (for example, a mobile phone) is transmitted to the card IC chip through the secure communication (encrypted communication). Since information can be transmitted from the portable terminal to the IC card through the secure communication in this way, highly confidential information (for example, PIN information) can be sent confidently.

In this case, since the user can use his/her portable terminal to input information at a distance from the information processing device, high user convenience is achieved. In addition, since a conventional input pad is not needed, a third party cannot illegally obtain the information. Further in this case, although the information processing device intervenes between the portable terminal and the IC card, security between the information processing device and the IC card is assured. In addition, information sent through the information processing device is one that is sent through secure communication, namely one that is encrypted. Consequently, even if a third party was able to illegally obtain the information from the information processing device, the third party could not decrypt the information. In this way, increased security can be achieved for the entire system.

In the information processing system of the present invention, the card IC chip may include a collation processing section that performs collation processing using information input on the portable terminal, and a read/write permitting section that permits reading from/writing to the card IC chip when the collation processing is successful.

With this configuration, when the collation processing using the information input on the portable terminal is successful (successful collation), reading from/writing to the card IC chip is permitted. In this way, the information input on the portable terminal can be used to determine whether the use of the card IC chip should be permitted or not.

In the information processing system of the present invention, the information input on the portable terminal may include PIN information of the user of the portable terminal, and the reading from/writing to the card IC chip may include settlement processing in the IC card.

With this configuration, when the collation processing using the PIN information is successful (successful collation), settlement processing in the IC card is permitted. In this way, the PIN information input on the portable terminal can be used to determine whether settlement processing in the IC card should be permitted or not.

In the information processing system of the present invention, the information input on the portable terminal may include PIN information of the user of the portable terminal, and the reading from/writing to the card IC chip may include approval processing for the IC card.

In the information processing system of the present invention, the information processing device may include a card slot section for receiving an inserted IC card, and the card processing section may communicate with the card IC chip while the IC card is inserted in the card slot section and when security is satisfied between the information processing device and the card IC chip, perform information processing function of the card IC chip.

In the information processing system of the present invention, the information processing device may include a card hover section over which the card is held up, and the card processing section may communicate with the card IC chip while the IC card is held up over the card hover section and when security is satisfied between the information processing device and the card IC chip, perform information processing function of the card IC chip.

In the information processing system of the present invention, the terminal IC chip may be an SIM chip or a security processing chip.

With this configuration, the SIM chip or the security processing chip provided on the portable terminal can be used to provide secure communication with the IC card.

In the information processing system of the present invention, the portable terminal may be provided with two terminal IC chips: a first terminal chip is an SIM chip and a second terminal IC chip is a security processing chip, and the portable terminal may further be provided with a chip selecting section that selects either one of the SIM chip and the security processing chip as the terminal IC chip to be processed with the card IC chip.

With this configuration, when the portable terminal is provided with both the SIM chip and the security processing chip, one of the chips can be used to provide secure communication with the IC card.

In the information processing system of the present invention, the chip selecting section may make a comparison between a security level of the SIM chip and a security level of the security processing chip, and select one that has a higher security level as determined by the comparison as the terminal IC chip to be processed with the card IC chip.

With this configuration, when the portable terminal is provided with both the SIM chip and the security processing chip, the one that has a higher security level can be used to provide secure communication with the IC card.

In the information processing system of the present invention, the chip selecting section may make a comparison between a processing speed of the SIM chip and a processing speed of the security processing chip, and select one that has a higher processing speed as determined by the comparison as the terminal IC chip to be processed with the card IC chip.

With this configuration, when the portable terminal is provided with both the SIM chip and the security processing chip, the one that has a higher processing speed can be used to provide secure communication with the IC card.

In the information processing system of the present invention, the information processing device may include a server communication section that communicates with a settling server to perform settlement processing in the IC card, and the server communication section may transmit processing result information obtained from the card IC chip to the settling server.

With this configuration, the processing result information (for example, settlement information) obtained from the card IC chip can be transmitted from the information processing device to the settling server to use the information in settlement processing in the IC card.

In the information processing system of the present invention, the information processing device may include a server communication section that communicates with an approval server to perform approval processing for the IC card, and the server communication section may transmit information obtained from the card IC chip to the approval server.

The information processing device of the present invention is an information processing device for use in an information processing system including a portable terminal, the device including: a card processing section that communicates with a card IC chip, which is an IC chip provided on an IC card, and when security is satisfied between the information processing device and the card IC chip, performs information processing function of the card IC chip; an authentication processing section that performs authentication processing between a terminal IC chip, which is an IC chip provided on the portable terminal, and the card IC chip through the card processing section; and a secure communication section that provides secure communication between the terminal IC chip and the card IC chip through the card processing section when the authentication processing is successful, wherein information input on the portable terminal is transmitted to the card IC chip through the secure communication.

In a similar manner to that described above, according to the device, high user convenience can be achieved and increased security can also be achieved for the entire system.

The information processing method of the invention is used in an information processing system including an information processing device and a portable terminal, the information processing device including a card processing section that communicates with a card IC chip, which is an IC chip provided on an IC card, and when security is satisfied between the information processing device and the card IC chip, performs information processing function of the card IC chip, the method including: performing authentication processing between a terminal IC chip, which is an IC chip provided on the portable terminal, and the card IC chip through the card processing section; and providing secure communication between the terminal IC chip and the card IC chip through the card processing section when the authentication processing is successful, wherein information input on the portable terminal is transmitted to the card IC chip through the secure communication.

In a similar manner to that described above, according to the method, high user convenience can be achieved and increased security can also be achieved for the entire system.

The portable terminal of the invention is a portable terminal used in an information processing system including an information processing device, the information processing device including a card processing section that communicates with a card IC chip, which is an IC chip provided on an IC card, and when security is satisfied between the information processing device and the card IC chip, performs information processing function of the card IC chip, and the portable terminal including: an authentication processing section that performs authentication processing between a terminal IC chip, which is an IC chip provided on the portable terminal, and the card IC chip through the card processing section; and a secure communication section that provides secure communication between the terminal IC chip and the card IC chip through the card processing section when the authentication processing is successful, wherein information input on the portable terminal is transmitted to the card IC chip through the secure communication.

In a similar manner to that described above, according to the terminal, high user convenience can be achieved and increased security can also be achieved for the entire system.

The SIM chip of the invention is an SIM chip provided on a terminal device, the terminal device being used in an information processing system including an information processing device, the information processing device including a card processing section that communicates with a card IC chip, which is an IC chip provided on an IC card, and when security is satisfied between the information processing device and the card IC chip, performs information processing function of the card IC chip, and the SIM chip including: an authentication processing section that performs authentication processing between the SIM chip and the card IC chip through the card processing section; and a secure communication section that provides secure communication between the SIM chip and the card IC chip through the card processing section when the authentication processing is successful, wherein information input on the portable terminal is transmitted to the card IC chip through the secure communication.

In a similar manner to that described above, according to the chip, high user convenience can be achieved and increased security can also be achieved for the entire system.

The security processing chip of the invention is a security processing chip provided on a terminal device, the terminal device being used in an information processing system including an information processing device, the information processing device including a card processing section that communicates with a card IC chip, which is an IC chip provided on an IC card, and when security is satisfied between the information processing device and the card IC chip, performs information processing function of the card IC chip, and the security processing chip including: an authentication processing section that performs authentication processing between the security processing chip and the card IC chip through the card processing section; and a secure communication section that provides secure communication between the security processing chip and the card IC chip through the card processing section when the authentication processing is successful, wherein information input on the portable terminal is transmitted to the card IC chip through the secure communication.

In a similar manner to that described above, according to the chip, high user convenience can be achieved and increased security can also be achieved for the entire system.

According to the present invention, high user convenience can be achieved and increased security can also be achieved for the entire system.

An information processing system according to embodiments of the invention will now be described with reference to the drawings. In the embodiments, an information processing system intended for use in a payment system at the register in a shop or the like will be illustrated.

First Embodiment

A configuration of a first embodiment of information processing system of the invention will now be described with reference to the drawings. FIG. 1 is a diagram for illustrating a configuration of an information processing system according to the first embodiment. As shown in FIG. 1, the information processing system includes an information processing device 2, such as a POS terminal, and a portable terminal 3, such as a mobile phone. The information processing device 2 includes a card slot section 5 for receiving an inserted IC card 4. The IC card 4 is a credit card that has a credit function.

The information processing device 2 also includes a card processing section 6. The card processing section 6 communicate with an IC chip (card IC chip 7) of the IC card 4 in a contact manner while the IC card 4 is inserted in the card slot section 5 and when it is confirmed that security is satisfied between the information processing device and card IC chip 7, perform information processing function of the card IC chip 7. Accordingly, while the IC card 4 is inserted in the card slot section 5, various functions of the card IC chip 7 can be executed by the information processing device 2. In other words, while the IC card 4 is inserted in the card slot section 5, various functions of the card IC chip 7 may be considered to be provided to the information processing device 2.

The card IC chip 7 includes an authentication processing section 8, a secure communication section 9, a collation processing section 10, and a read/write permitting section 11. The authentication processing section 8 has a function of performing authentication processing between an IC chip (terminal IC chip 12) of the portable terminal 3 and the card IC chip through the card processing section 6. The authentication processing is for confirming that they are communicating with a correct counterpart each other. When the authentication processing is successful (successful authentication), confidential information is shared between the card IC chip 7 and the terminal IC chip 12. The secure communication section 9 has a function of providing secure communication with the terminal IC chip 12 through the card processing section 6 when the authentication processing is successful. The function sets up a communication channel (also referred to as a virtual communication channel or a secure path) that is encrypted based on the confidential information shared between the card IC chip 7 and the terminal IC chip 12, and the communication channel can be used to provide secure communication. Information such as PIN information input on the portable terminal 3 is sent to the card IC chip 7 through the secure communication.

The collation processing section 10 has a function of performing collation processing using the PIN information input on the portable terminal 3. The portable terminal 3 includes an input section 13, such as numeral keys or a touch panel. The user of the portable terminal 3 inputs information such as PIN information from the input section 13. The read/write permitting section 11 has a function of permitting reading from/writing to the card IC chip 7 when the collation processing is successful (successful collation). Specifically, the reading/writing is settlement processing in the IC card 4.

The information processing device 2 includes a server communication section 15 that communicates with a settling server 14. The server communication section 15 has a function of transmitting result information of settlement processing performed in the card IC chip 7 (settlement information) to the settling server 14. The settling server 14 is an external server constituting a settlement system and has a function of using the settlement information sent from the portable terminal 3 to perform settlement processing in the IC card 4.

The terminal IC chip 12 is composed of an SIM chip or a security processing chip. The terminal IC chip 12 may have a function of performing settlement processing, and in this case, the terminal IC chip 12 may be considered to be an IC chip intended for settlement processing.

The terminal IC chip 12 includes an authentication processing section 16 and a secure communication section 17. The authentication processing section 16 has a function of performing authentication processing between the terminal IC chip and the card IC chip 7 through the card processing section 6. The secure communication section 17 has a function of providing secure communication with the card IC chip 7 through the card processing section 6 when the authentication processing is successful (successful authentication). The PIN information obtained from the input section 13 is sent to the information processing device 2 through the secure communication.

Figure 2:
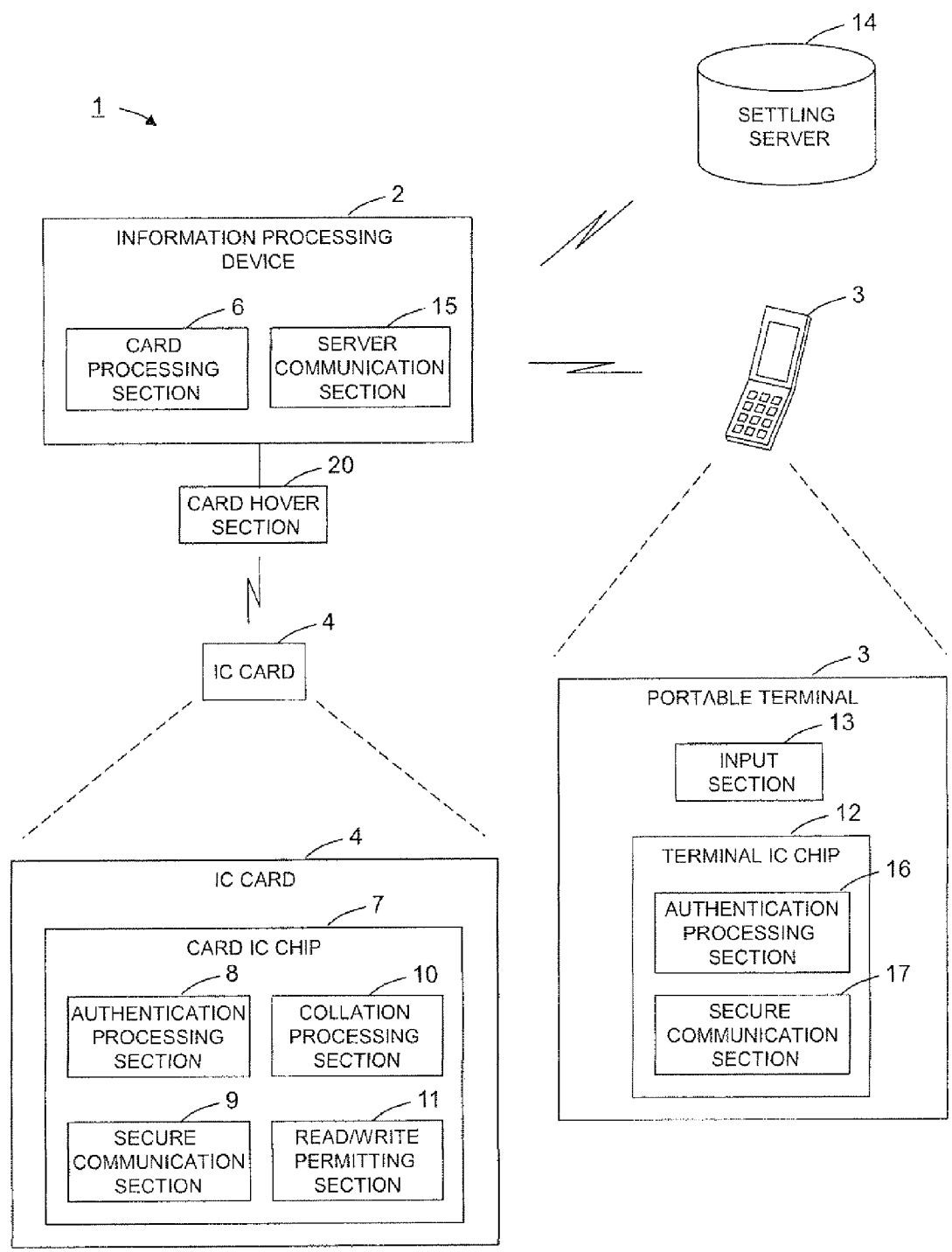
FIG. 2 is a diagram for illustrating a variation of the information processing system according to the first embodiment of the invention (a variation of information processing device).

FIG. 2 shows a variation of the information processing system 1 according to the embodiment (a variation of information processing device 2). As shown in FIG. 2, the information processing device 2 includes a card hover section 20 for the user to hold the IC card 4 up over the section.

In this case, the card processing section 6 has a function of communicating with the card IC chip 7 in a non-contact manner while the IC card 4 is held up over the card hover section 20 and when security is satisfied between the information processing device and the card IC chip 7, performing information processing function of the card IC chip 7. Accordingly, while the IC card 4 is held up over the card hover section 20, various functions of the card IC chip 7 can be executed by the information processing device 2. In other words, while the IC card 4 is held up over the card hover section 20, various functions of the card IC chip 7 may be considered to be provided to the information processing device 2.

It should be noted that the card hover section 20 may be provided with a support member for supporting the IC card 4. In this case, the position of the IC card 4 that is held up can temporarily be fixed relative to the card hover section 20. A proper positional relationship between the two is thus maintained, and thereby the non-contact communication as described above can be performed more reliably.

Figure 3:
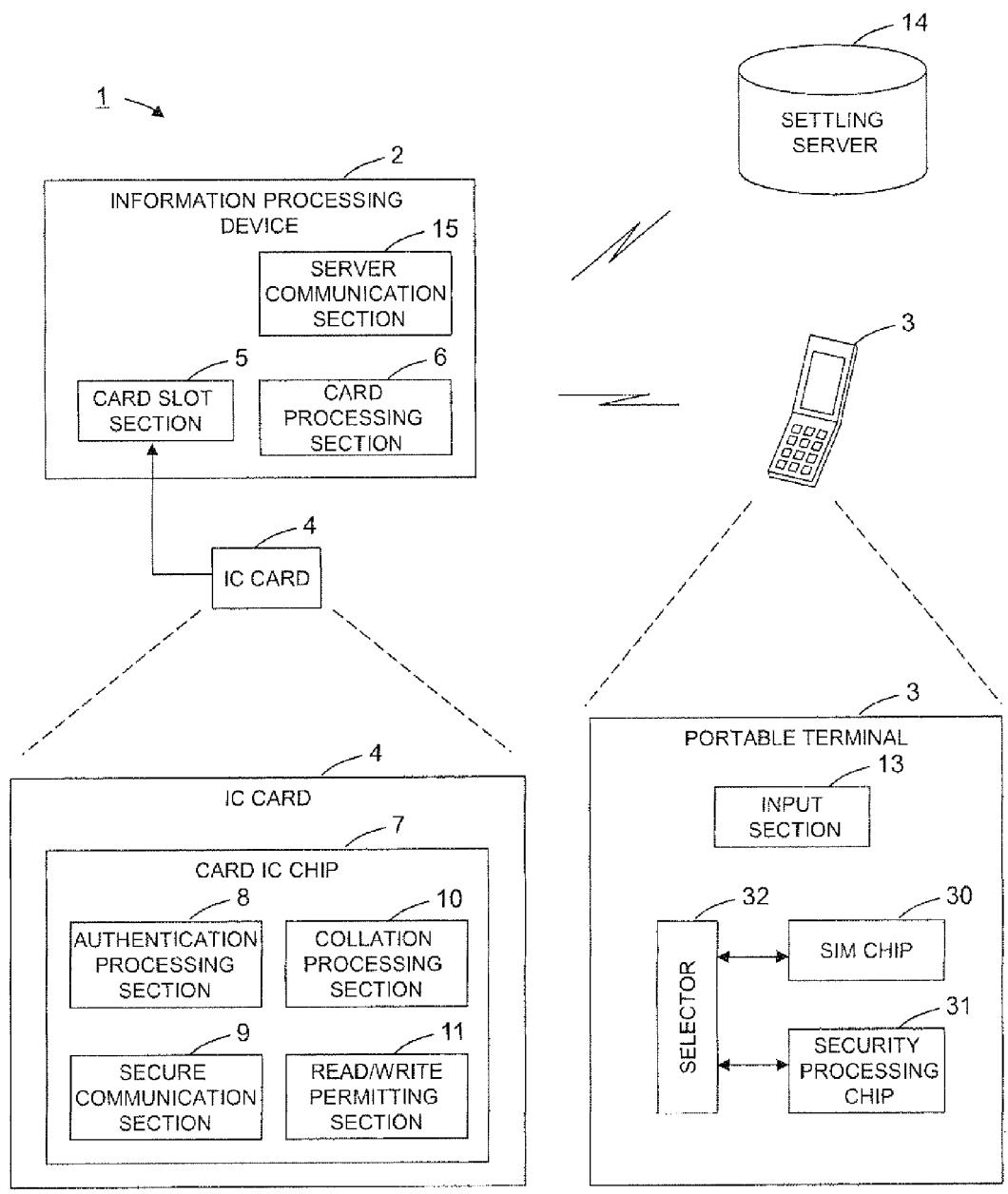
FIG. 3 is a diagram for illustrating a further variation of the information processing system according to the first embodiment of the invention (a variation of portable terminal).

FIG. 3 shows a further variation of the information processing system 1 according to the embodiment (a variation of portable terminal 3). As shown in FIG. 3, the portable terminal 3 includes two terminal chips (a SIM chip 30 and a security processing chip 31) and a selector 32.

The SIM chip 30 has a function of mainly allowing the use of a telephone. The SIM chip 30 includes, for example, a chip mounted on an SIM card provided by a telephone carrier, which has stored therein a specific number associated with a telephone number. One example of such SIM card is a universal subscriber identity module (USIM) card adopted for the third generation mobile phone. The SIM chip may also includes an authentication processing section and a secure communication section.

The security processing chip 31 has a function of mainly assuring security. For example, the security processing chip 31 includes a CPU and a memory, and has a secure structure for the CPU and the memory in terms of a physical, electrical, or software aspect. The security processing chip 31 includes an ISO/IEC 14443 type A or type B based electronic settlement IC chip, an IC chip mounted on an IC identification, FeliCa (registered trademark) chip, and the like. Similarly to the SIM chip, the security processing chip 31 may also includes an authentication processing section and a secure communication section.

The selector 32 has a function of selecting either one of the SIM chip 30 and the security processing chip 31 as the terminal IC chip 12 to be processed with the card IC chip 7. The selector 32 corresponds to the chip selecting section.

For example, the selector 32 makes a comparison between the security level of the SIM chip 30 and the security level of the security processing chip 31, and selects one that has a higher security level as determined by the comparison as the terminal IC chip 12 to be processed with the card IC chip 7. Security level information (for example, "high", "moderate", "low", or the like) is preset to each of the SIM chip 30 and the security processing chip 31.

Alternatively, the selector 32 makes a comparison between the processing speed of the SIM chip 30 and the processing speed of the security processing chip 31, and selects one that has a higher processing speed as determined by the comparison as the terminal IC chip 12 to be processed with the card IC chip 7. Processing speed information (for example, "high", "moderate", "low", or a numeral value that may be used as an indicator of a processing speed, or the like) is preset to each of the SIM chip 30 and the security processing chip 31.

Furthermore, processes may be distributed between the SIM chip 30 and the security processing chip 31 on the basis of a function that the selector 32 processes. For example, this applies to the case where settlement applications are handled by the SIM chip 30 and encryption and management for cryptographic keys are handled by the security processing chip 31.

It should be noted that the terminal IC chip 12 to be processed with the card IC chip 7 may be selected (statically selected) by the user of the portable terminal 3 in advance as either one of the chips or may be automatically selected (dynamically selected) depending on the operational condition of each chip. For example, the dynamic selection is made based on processing speed values obtained by the selector 32 causing internal CPUs (not shown) in the card IC chip 7 and the terminal IC chip 12 to calculate trial data (the processing speed value represents a possible number of calculations per second or quantized versions of the possible number of calculations). The dynamic selection is also made based on information (operational clock frequency, operational bit length, or the like) of the respective internal CPUs read from the card IC chip or the terminal IC chip by the selector 32.

The operation of the information processing system 1 thus configured will now be described with reference to a sequence diagram in FIG. 4. Here, a scenario where payment is made at the register in a shop will be illustrated as an example.

When payment is made at the register in a shop, a clerk first registers a product that the user intends to buy with a POS terminal (information processing device 2). Once the total amount of purchase is displayed on the POS terminal, the user sets an electronic money card (IC card 4) on the information processing device 2 (i.e. inserts the card into the card slot section 5). In addition to a prepaid card, the electronic money card may be any card such as a postpaid card, a debit card, and credit card. The user then inputs personal identification number (PIN) information from his/her own portable terminal 3 at hand.

Figure 4:
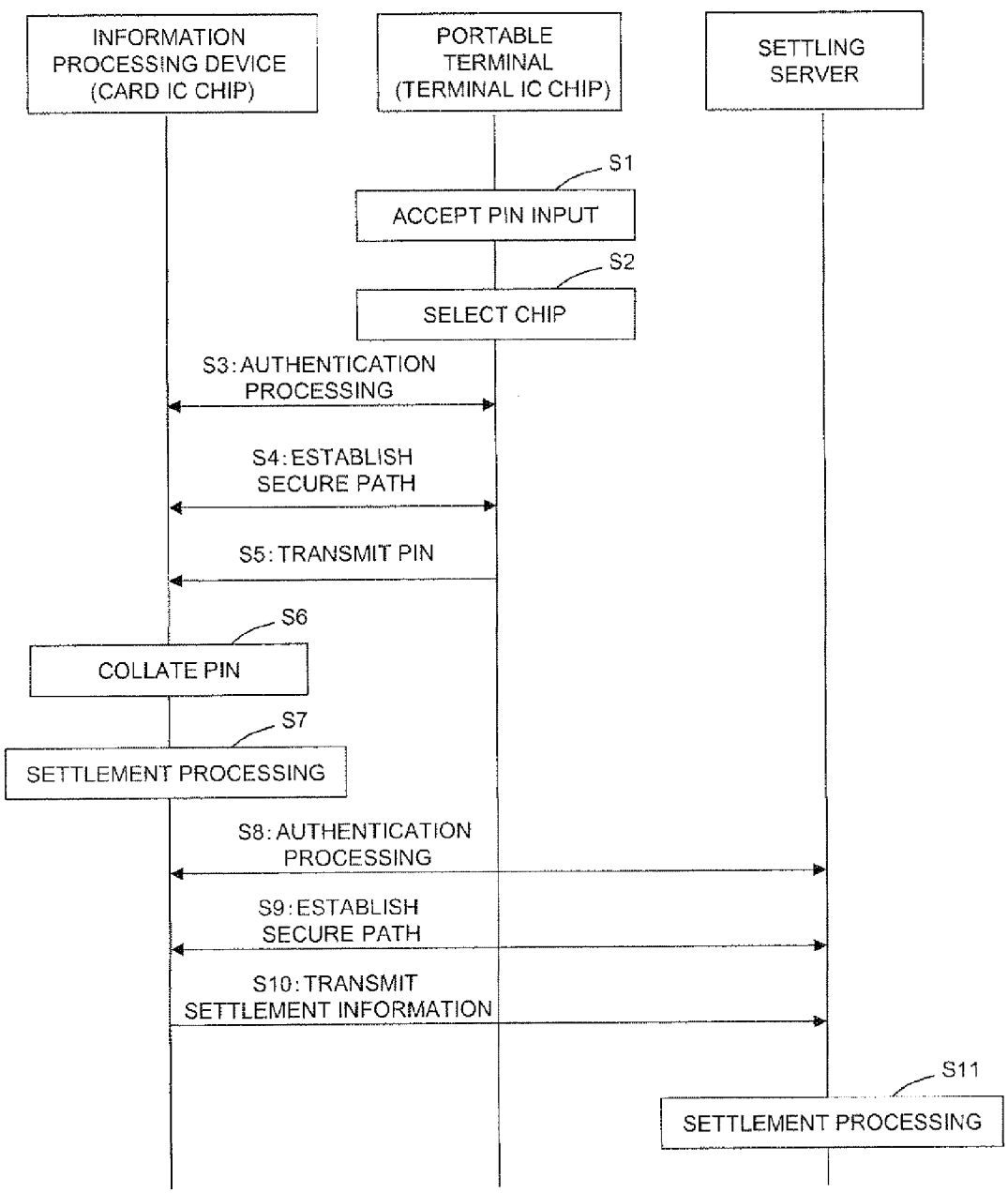
FIG. 4 is a sequence diagram showing a process flow in the information processing system according to the first embodiment of the invention.

In this case, as shown in FIG. 4, in the information processing system 1, the PIN information input is first accepted on the portable terminal 3 (S1), and then the terminal IC chip 12 to be used is selected based on a security level or a processing speed (S2).

Subsequently, authentication processing between the terminal IC chip 12 and the card IC chip 7 is performed (S3), and when the authentication processing is successful, an encrypted communication channel (secure path) is established between the terminal IC chip 12 and the card IC chip 7 based on confidential information shared between the terminal IC chip 12 and the card IC chip 7 (S4). Then, the PIN information is transmitted from the terminal IC chip 12 to the card IC chip 7 through secure communication (encrypted communication) (S5).

In the card IC chip 7, collation processing is performed by using the PIN information received from the terminal IC chip 12 (S6), and when the collation processing is successful, settlement processing is performed in the IC card 4 (S7).

Next, authentication processing between the information processing device 2 and the settling server 14 is performed (S8), and when the authentication processing is successful, a secure path is established between the information processing device 2 and the settling server 14 (S9). Subsequently, result information of settlement processing (settlement information) is transmitted from the information processing device 2 to the settling server 14 through secure communication (encrypted communication) (S10). In settling server 14, then, settlement processing is performed by using the settlement information (S11).

According to the information processing system 1 of the embodiment of the invention, high user convenience can be achieved and increased security can also be achieved for the entire system.

In other words, in the embodiment, authentication processing between the card IC chip 7 and the terminal IC chip 12 is performed, and when the authentication processing is successful (successful authentication), secure communication is provided between the card IC chip 7 and the terminal IC chip 12. Then, information (for example, PIN information) input on the portable terminal 3 (for example, a mobile phone) is transmitted to the card IC chip 7 through the secure communication (encrypted communication). Since information can be transmitted from the portable terminal 3 to the IC card 4 through the secure communication in this way, highly confidential information (for example, PIN information) can be sent confidently.

In this case, since the user can use his/her portable terminal 3 to input information at a distance from the information processing device 2, high user convenience is achieved. In addition, since a conventional input pad is not needed, a third party cannot illegally obtain the information. Further in this case, although the information processing device 2 intervenes between the portable terminal 3 and the IC card 4, security between the information processing device 2 and the IC card 4 is assured. In addition, information sent through the information processing device 2 is one that is sent through secure communication, namely one that is encrypted. Consequently, even if a third party was able to illegally obtain the information from the information processing device 2, the third party could not decrypt the information. In this way, increased security can be achieved for the entire system.

In the embodiments, when collation processing using information input on the portable terminal 3 is successful (successful collation), reading from/writing to the card IC chip 7 is permitted. In this way, the information input on the portable terminal 3 can be used to determine whether the use of the card IC chip 7 should be permitted or not.

Specifically, when the collation processing using PIN information is successful (successful collation), settlement processing in the IC card 4 is permitted. In this way, the PIN information input on the portable terminal 3 can be used to determine whether settlement processing in the IC card 4 should be permitted or not.

In the embodiments, the SIM chip 30 or the security processing chip 31 provided on the portable terminal 3 can be used to provide secure communication with the IC card 4.

Further, in the embodiments, the processing result information (settlement information) obtained from the card IC chip 7 can be transmitted from the information processing device 2 to the settling server 14 to use the information in settlement processing in the IC card 4.

In the embodiments, although description has been made to the case where the settlement information is transmitted from the information processing device 2 to the settling server 14, the settlement information may be transmitted from the portable terminal 3 to the settling server 14. For example, the settlement information may be sent from the information processing device 2 to the portable terminal 3 through secure communication and then sent from the portable terminal 3 to the settling server 14 through secure communication.

In a variation of the embodiment (a variation shown in FIG. 3), the portable terminal 3 is provided with both the SIM chip 30 and the security processing chip 31, and in this case, one of the chips can be used to provide secure communication with the IC card 4.

For example, one of the chips that has a higher security level can be used to provide secure communication with the IC card 4. Alternatively, one of the chips that has a higher processing speed can be used to provide secure communication with the IC card 4.

Second Embodiment

Figure 5:
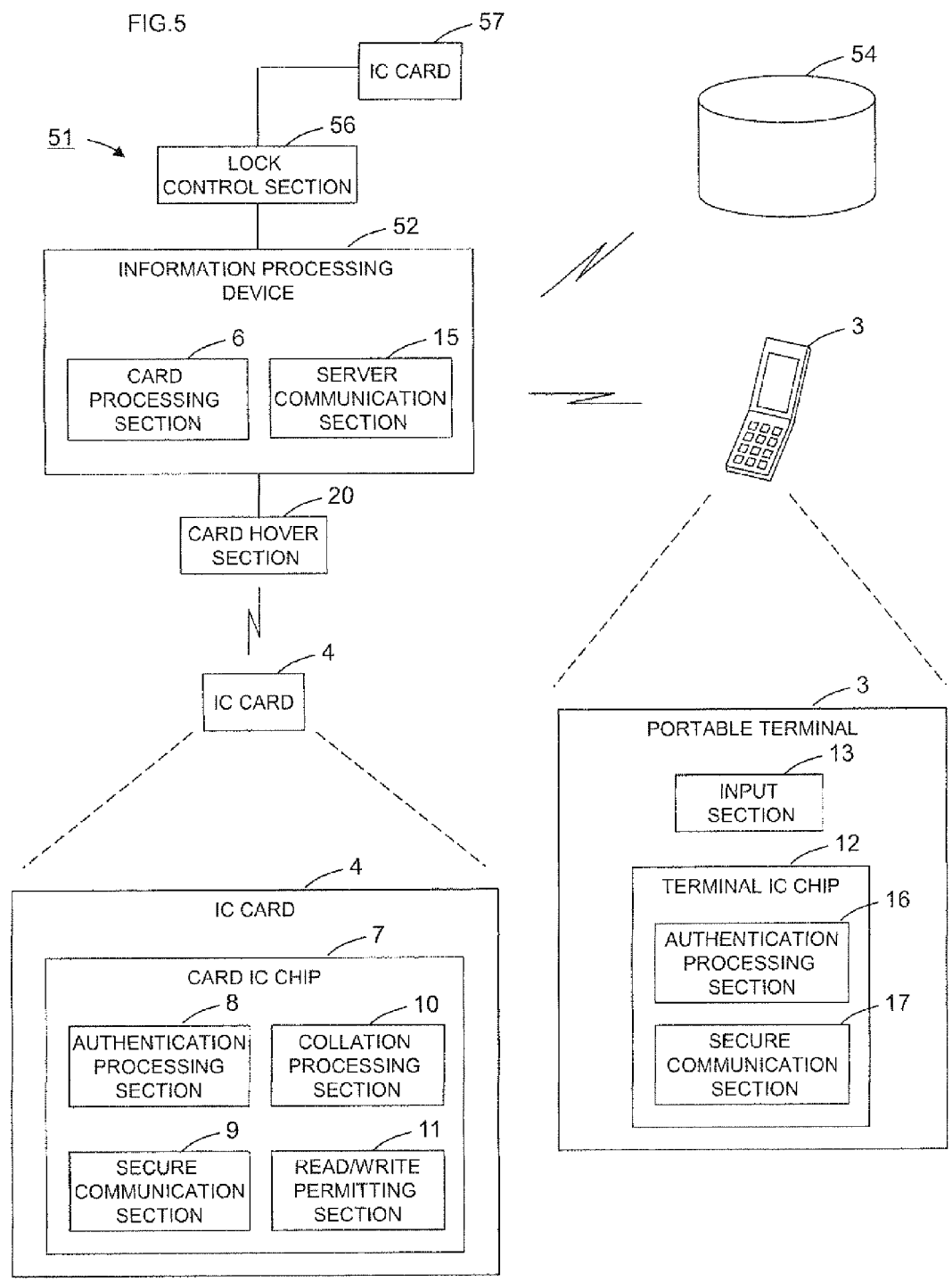
FIG. 5 is a diagram for illustrating a configuration of an information processing system according to a second embodiment of the invention.

FIG. 5 shows an example of an information processing system 51 according to a second embodiment. As shown in FIG. 5, the information processing device 52 is an entry control system that includes a card hover section 20 for the user to hold the IC card 4 up over the section.

The information processing device 52 communicates with an entry control server 54 that stores entry conditions, and causes the card processing section 6 to identify whether information in the IC card 4 that is held up meets the entry conditions or not. When the information in the card 4 (for example, employee number that identifies an individual) meets the entry conditions, the information processing device 52 issues an instruction to a lock control section 56 to open a lock and a lock 57 is opened.

In this case, the card processing section 6 has a function of communicating with the card IC chip 7 in a non-contact manner while the IC card 4 is held up over the card hover section 20 and when security is satisfied between the information processing device and the card IC chip 7, performing information processing function of the card IC chip 7.

It should be noted that the card hover section 20 may be provided with a support member for supporting the IC card 4. In this case, the position of the IC card 4 that is held up can temporarily be fixed relative to the card hover section 20. A proper positional relationship between the two is thus maintained, and thereby the non-contact communication as described above can be performed more reliably.

Although the portable terminal 3 includes a terminal IC chip 12, a SIM chip 30 and a security processing chip 31 and a selector 32 may be provided similarly to the portable terminal shown in FIG. 3. In this case, as in the case of FIG. 3, the SIM chip 30 has a function of mainly allowing the use of a telephone, the SIM chip 30 includes, for example, a chip mounted on an SIM card provided by a telephone carrier, which has stored therein a specific number associated with a telephone number, and the SIM chip may also includes an authentication processing section and a secure communication section.

Figure 6:
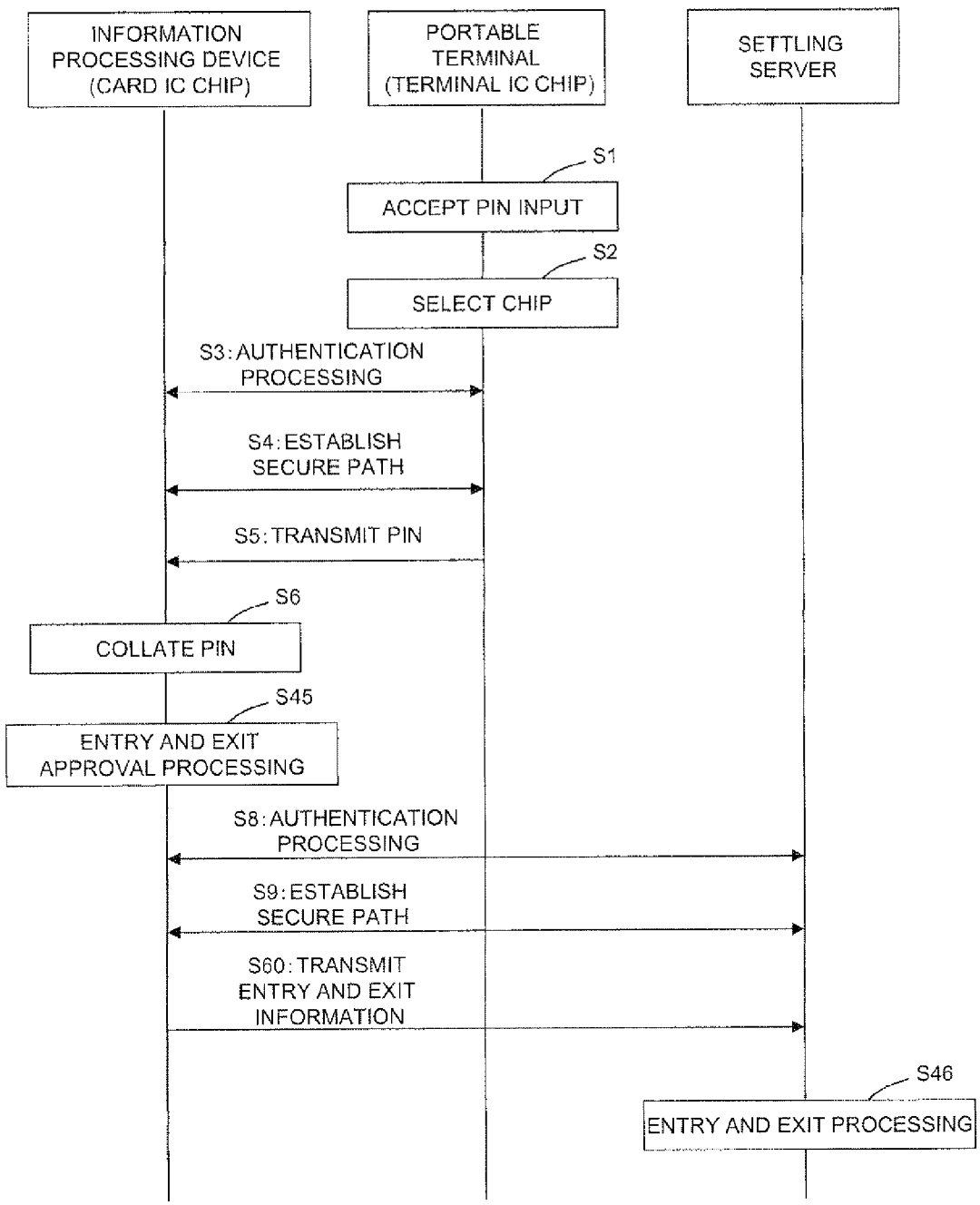
FIG. 6 is a sequence diagram showing a process flow in the information processing system according to a sixth embodiment of the invention.

The information processing system 51 thus configured will now be described with reference to a sequence diagram in FIG. 6. Here, a scenario where a person enters and exits a room where security should be maintained will be illustrated as an example.

When the person tries to enter the room, he/she holds his/her card 4 up over the card hover section 20 connected to the information processing device 52. The card hover section 20 detects the card 4 when it is ready for communication with the card 4 or by a proximity sensor provided on a surface to which the card is touched and waits for PIN information.

The person inputs personal identification number (PIN) information from his/her own portable terminal 3 at hand. At this time, in the information processing system 51 of the embodiment, the information processing device 52 first enters a waiting state for PIN information in response to a signal from the proximity sensor or the like, as shown in FIG. 6. Thereafter, the portable terminal 3 accepts PIN information input (S1). Subsequently, in the case where the portable terminal includes a selector 32 and two chips as shown in FIG. 3, the terminal IC chip to be used is selected based on a security level or a processing speed. In the case of a single terminal IC chip 12, step S2 is omitted (S2).

Subsequently, authentication processing between the terminal IC chip 12 and the card IC chip 7 is performed (S3), and when the authentication processing is successful, an encrypted communication channel (secure path) is established between the terminal IC chip 12 and the card IC chip 7 based on confidential information shared between the terminal. IC chip 12 and the card IC chip 7 (S4). Then, the PIN information is transmitted from the terminal IC chip 12 to the card IC chip 7 through secure communication (encrypted communication) (S5).

In the card IC chip 7, collation processing is performed by using the PIN information received from the terminal IC chip 12 (S6), and when the collation processing is successful, entry and exit approval processing is performed (S45).

Next, authentication processing between the information processing device 2 and the entry control server 14 is performed (S8), and when the authentication processing is successful, a secure path is established between the information processing device 2 and the entry control server 54 (S9). Subsequently, result information of entry and exit approval processing (entry and exit information) is transmitted from the information processing device 2 to the entry control server 54 through secure communication (encrypted communication) (S60). The entry and exit information is then updated and entry and exit processing is performed in the entry control server 54 (S46).

According to the entry and exit system 1 of the embodiment of the invention, high user convenience can be achieved. As in the case of the first embodiment, increased security can also be achieved for the entire system.

Embodiments of the present invention have been described above by way of example. The scope of the invention, however, is not limited thereto and alterations and modifications may be made as required without departing from the scope of the appended claims.

Although presently preferred embodiments of the invention have been described above, it is to be understood that various modifications may be made to the embodiments thereof and the appended claims are intended to encompass all such modifications that fall within the scope of the true spirit and scope of the invention.

INDUSTRIAL APPLICABILITY

As described above, the information processing system according to the invention, it is advantageous that high user convenience can be achieved and increased security can also be achieved for the entire system, and the present invention is useful for use at the register in a shop for a payment system and the like.

REFERENCE SIGNS LIST

1 Information processing system
2 Information processing device
3 Portable terminal
4 IC card
5 Card slot section
6 Card processing section
7 Card IC chip
8 Authentication processing section
9 Secure communication section
10 Collation processing section
11 read/write permitting section
12 Terminal IC chip
13 Input section
14 Settling server
15 Server communication section
16 Authentication processing section
17 Secure communication section
20 Card hover section
30 SIM chip
31 Security processing chip
32 Selector

The invention claimed is:

1. An information processing system comprising:
a portable terminal,
an IC card, and
an information processor structured to communicate with the IC card,
the portable terminal comprising:
a first authentication processor that performs authentication processing with the IC card for confirming that the portable terminal is communicating with a correct counterpart;
a first secure communicator that performs encrypted communication between the IC card and the portable terminal; and
an inputter for inputting information,
the IC card comprising:
a second authentication processor that performs the authentication processing with the portable terminal;
a second secure communicator that performs the encrypted communication,
the information processor comprising
a card processor that performs information processing function of the IC card,
wherein the first authentication processor of the portable terminal performs authentication processing with the second authentication processor of the IC card through the card processor on the information processor,
information input from the inputter of the portable terminal is transmitted on a communication channel from the first secure communicator of the portable terminal to the second secure communicator of the IC card that is a correct counterpart as confirmed by the authentication processing through the card processor of the information processor structured to communicate with the IC card that is the correct counterpart, and
the communication channel that is encrypted based on confidential information shared between the portable terminal and the IC card,
wherein the IC card further comprises;
a collation processor that performs collation using information input from the inputter of the portable terminal; and
a read/write permitter that permits reading from/writing to the IC card when the collation is successful by the collation processor, and
wherein information input from the inputter of the portable terminal is input from the second secure communicator of the IC card that is the correct counterpart as confirmed by the authentication processor to the collation processor of the IC card.

2. The information processing system according to claim 1, wherein
the information processor is structured to communicate with the IC card that is the correct counterpart as confirmed by the authentication processing.

3. The information processing system according to claim 1, wherein the card processor of the information processor structured to communicate with the IC card that is the correct counterpart as confirmed by the authentication processing performs reading from/writing to the IC card once permitted by the read/write permitter.

4. An IC card for communication with an information processor that communicates with a portable terminal, the IC card comprising:
a second authentication processor that performs authentication processing with a first authentication processor provided on the portable terminal for confirming that the IC card is communicating with a correct counterpart; and
a second secure communicator that performs encrypted communication with a first secure communicator provided on the portable terminal,
the second authentication processor performs the authentication processing with the first authentication processor of the portable terminal through a card processor provided on the information processor,
information input from an inputter provided on the portable terminal that is the correct counterpart as confirmed by the authentication processing is transmitted on a communication channel from the first secure communicator of the portable terminal to the second secure communicator of the IC card that is a correct counterpart as confirmed by the authentication processing through the card processor of the information processing device for communication with the IC card that is the correct counterpart, and
the communication channel that is encrypted based on confidential information shared between the portable terminal and the IC card,
wherein the IC card further comprises:
a collation processor that performs collation using information input from the inputter of the portable terminal; and
a read/write permitter that permits reading from/writing to the IC card when the collation is successful by the collation processor, and
information input from an inputter of the portable terminal that is the correct counterpart as confirmed by the authentication processing is input from the second secure communicator of the IC card to the collation processor of the IC card.

5. An information processing device for communication with a portable terminal and an IC card, the information processing device comprising:
a card processor that performs information processing on the IC card,
wherein when it is confirmed that the IC card is a correct counterpart to the portable terminal by authentication processing between a first authentication processor provided on the portable terminal and a second authentication processor provided on the IC card;
information input from an inputter of the portable terminal is transmitted on a communication channel from a first secure communicator of the portable terminal to a second secure communicator of the IC card that is a correct counterpart as confirmed by the authentication processing through the card processor of the information processing device for communication with the IC card that is the correct counterpart, and
the communication channel that is encrypted based on confidential information shared between the portable terminal and the IC card, and
wherein when it is confirmed that (1) the IC card is a correct counterpart to the portable terminal by the authentication processing and (2) collation using information input from the inputter of the portable terminal is successful and (3) reading from/writing to the IC card is permitted, the card processor of the information processor performs reading from/writing to the IC card.

6. An information processing system comprising:
a portable terminal,
an IC card, and
an information processor structured to communicate with the IC card,
the information processing system comprising:
wherein the portable terminal:
performs authentication processing with the IC card through the information processor,
confirms whether (1) the IC card is a correct counterpart to the portable terminal by the authentication processing and (2) collation using information input from an inputter of the portable terminal is successful and (3) reading from/writing to the IC card is permitted, and
transmits information, that is input to the portable terminal, on a communication channel from the portable terminal to the IC card that is a correct counterpart as confirmed by the authentication processing through the information processor structured to communicate with the IC card that is the correct counterpart; and
the communication channel is encrypted based on confidential information shared between the portable terminal and the IC card.

7. The information processing system according to claim 6, wherein when it is confirmed that the (1) IC card is a correct counterpart to the portable terminal by the authentication processing and (2) collation using information input from the inputter of the portable terminal is successful and (3) reading from/writing to the IC card is permitted, the information processor transmits result information of settlement processing performed in the IC card to a settling server.

8. The information processing system according to claim 6, wherein when it is confirmed that (1) the IC card is a correct counterpart to the portable terminal by the authentication processing and (2) collation using information input from the inputter of the portable terminal is successful and (3) reading from/writing to the IC card is permitted, the information processing device transmits result information of entry and exit approval processing performed in the IC card to an entry control server.

9. An IC card for communication with an information processor that communicates with a portable terminal, the IC card comprising:
wherein when it is confirmed that (1) the IC card is a correct counterpart to the portable terminal by authentication processing, (2) collation using information input from an inputter of the portable terminal is successful and (3) reacting from/writing to the IC card is permitted, the IC card that is a correct counterpart as confirmed by the authentication processing receives information, that is input to the portable terminal, on a communication channel from the portable terminal through the information processor that communicates with the IC card that is the correct counterpart, and the communication channel is encrypted based on confidential information shared between the portable terminal and the IC card.

10. An information processing device for communication with a portable terminal and an IC card, wherein when it is confirmed that (1) the IC card is a correct counterpart to the portable terminal by authentication processing between the portable terminal and the IC card and (2) collation using information input from an inputter of the portable terminal is successful and (3) reading from/writing to the IC card is permitted, the information processing device for communication with the IC card that is a correct counterpart as confirmed by an authentication processing, that the portable terminal performs, passes through information that is input to the portable terminal, on a communication channel from the portable terminal to the IC card through the information processing device for communication with the IC card that is the correct counterpart, and the communication channel is encrypted based on confidential information shared between the portable terminal and the IC card.

11. The information processing device according to claim 10, wherein when (1) it is confirmed that the IC card is a correct counterpart to the portable terminal by the authentication processing and (2) collation using information input from the input section inputter of the portable terminal is successful and (3) reading from/writing to the IC card is permitted, the information processing device transmits result information of settlement processing performed in the IC card to a settling server.

12. The information processing device according to claim 10, wherein when (1) it is confirmed that the IC card is a correct counterpart to the portable terminal by the authentication processing and (2) collation using information input from the inputter of the portable terminal is successful and (3) reading from/writing to the IC card is permitted, the information processing device transmits result information of entry and exit approval processing performed in the IC card to an entry control server.

13. An information processing method used in an information processing system including an information processor that communicates with an IC card and a portable terminal including:

performing authentication processing between a portable terminal and an IC card through an information processor, confirming whether (1) the IC card is a correct counterpart to the portable terminal by the authentication processing and (2) collation using information input from an inputter of the portable terminal is successful and (3) reading from/writing to the IC card is permitted and transmitting information, that is input to the portable terminal, on a communication channel from the portable terminal to the IC card that is a correct counterpart as confirmed by the authentication processing through the information processor that communicates with the IC card that is the correct counterpart; and wherein the communication channel is encrypted based on confidential information shared between the portable terminal and the IC card.

14. The information processing method used in the information processing system according to claim 13 further including:

transmitting result information of settlement processing performed in the IC card to a settling server when it is confirmed that (1) the IC card is a correct counterpart to the portable terminal by the authentication processing and (2) collation using information input from the inputter of the portable terminal is successful and (3) reading from/writing to the IC card is permitted.

15. The information processing method used in the information processing system according to claim 13 further including:

transmits result information of entry and exit approval processing performed in the IC card to an entry control server when it is confirmed that (1) the IC card is a correct counterpart to the portable terminal by the authentication processing and (2) collation using information input from the inputter of the portable terminal is successful and (3) reading from/writing to the IC card is permitted.

* * * * *